(12) United States Patent
Funabashi et al.

(10) Patent No.: US 7,592,780 B2
(45) Date of Patent: Sep. 22, 2009

(54) BATTERY CHARGING APPARATUS

(75) Inventors: Kazuhiko Funabashi, Ibaraki (JP); Nobuhiro Takano, Ibaraki (JP); Kenro Ishimaru, Ibaraki (JP); Takao Aradachi, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 67 days.

(21) Appl. No.: 11/260,422

(22) Filed: Oct. 28, 2005

(65) Prior Publication Data
US 2006/0108986 A1    May 25, 2006

(30) Foreign Application Priority Data
Oct. 29, 2004  (JP)  ............ P2004-314961

(51) Int. Cl.
*H02J 7/04* (2006.01)
(52) U.S. Cl. .................. 320/152; 320/150; 320/163
(58) Field of Classification Search ................. 320/150, 320/163, 152
See application file for complete search history.

(56) References Cited

U.S. PATENT DOCUMENTS

| 5,592,070 | A | * | 1/1997 | Mino ................. 320/163 |
| 5,973,480 | A | | 10/1999 | Takano et al. |
| 5,977,749 | A | | 11/1999 | Kim |
| 6,191,560 | B1 | * | 2/2001 | Sakakibara ............ 320/150 |
| 6,297,617 | B1 | | 10/2001 | Aoyama |
| 2001/0050547 | A1 | | 12/2001 | Takimoto et al. |
| 2003/0102845 | A1 | | 6/2003 | Aker et al. |
| 2004/0105281 | A1 | | 6/2004 | Nakazawa et al. |

FOREIGN PATENT DOCUMENTS

| EP | 1043824 A2 | 10/2000 |
| JP | 10285819 | 10/1998 |
| JP | 11032444 | 2/1999 |
| JP | 2001352750 | 12/2001 |
| JP | 2002084749 | 3/2002 |
| JP | 2003079066 | 3/2003 |
| JP | 2004222407 | 8/2004 |

* cited by examiner

*Primary Examiner*—Adolf Berhane
*Assistant Examiner*—Yalkew Fantu
(74) *Attorney, Agent, or Firm*—Brundidge & Stanger, P.C.

(57) ABSTRACT

A battery charging apparatus includes a switching power source supplying a current to a battery pack, an input voltage detecting unit detecting an input voltage of the switching power source, a charging current control unit that detects a charging current of the battery and controlling the charging current in accordance with a charging current set value, and a microcomputer detecting whether the current supplied to the battery to be charged is less than a predetermined value on the basis of a detection signal of the input voltage detecting unit and controls the charging current set value in accordance with the input voltage. When it is discriminated that the input voltage is less than a predetermined value on the basis of the detection signal, the microcomputer sets the charging current set value to be a value less than the predetermined value.

12 Claims, 3 Drawing Sheets

BATTERY CHARGING APPARATUS

BACKGROUND OF THE INVENTION

1. Field of the Invention

The present invention relates to a battery charging apparatus for charging a secondary battery, such as a nickel•cadmium battery (Ni—Cd battery), a nickel•hydrogen battery or the like, and more particularly, to a battery charging apparatus capable of being used under the power condition in which the variation of the input voltage applied to the battery charging apparatus is severe.

2. Description of the Related Art

A secondary battery with a high capacity, such as the Ni—Cd battery or the nickel•hydrogen battery or the like, is widely used as a power source for a portable device, such as an electrical tool. Meanwhile, as a capacity of the secondary battery increases, the charging device for charging the battery in a short time has been developed to have a large output and a high capacity.

The following charging device has been developed. When the charge is performed by the charging device, the charging device detects various information of the battery, such as a battery voltage during the charge, a battery temperature, and a charging current, to prevent the life span of the battery from being reduced by the charge with a large current, and then performs an optimum charge control on the basis of the detected information on the battery. For example, the charging device, which detects the battery voltage during the charge to control the charging current, is disclosed in U.S. Pat. No. 5,973,480.

SUMMARY OF THE INVENTION

However, in the place in which a battery charger used in the electrical tool (cordless tool) are used, a power condition is not necessary to be well regulated. When there is no proper commercial power source in the vicinity of the work area, the commercial power source is supplied through an electric drum kit (power cord) from a place far away from the work area and then another electrical tool (tool with a cord) capable of using the battery charger and the commercial power source is connected to one plug of the electric drum kit in order to work.

In this case, power is supplied to the battery charger through a long power cord of the electric drum kit in order to charge the battery, and power is supplied to another electric tool through the long power cord. The power supply voltage supplied to the battery charger is markedly reduced due to a resistance of the power cord. Even when the resistance of the power cord is, for example, a value of, about 1 ohm, if a load current of another electric tool becomes a large current, for example, 20 A, a voltage drop is large and the input voltage of the battery charger is remarkably reduced. For example, as shown in FIG. 4, if a plurality of electric tools operated by the commercial power source is used at the same time, voltage reduction of the power source supplied to the battery charger becomes a level to not be ignored. A power supply circuit composed of the switching circuit used in the battery charger operates to make a predetermined charge current (corresponding to an output current, i.e. a predetermined input voltage before decreasing), even though the input voltage is decreased. For example, a power element, such as FET etc. as a switching element, excessively radiates a heat too much, so that there is a problem that the power supply circuit is broken in the worst case.

Accordingly, it is an object of the invention to provide a charging device capable of being used under the power condition in which the variation of the input voltage applied to the charging device is severe.

The object, another object, and new characteristic of the invention become clearer by the description of the following specification and accompanying drawings.

According to an aspect of the invention, a battery charging apparatus includes an input power source, a power supplying unit for supplying a charging current to a battery pack which is connected to the input power source, an input voltage detecting unit for detecting a voltage variation of the input power source, a charging current control unit that is electrically connected to the power supplying unit and controls the charging current supplied to the battery pack in accordance with a set value, and a set value control unit for controlling the set value to be applied to the charging current control unit. In this case, the set value control unit reduces the charging current to be supplied to the battery pack by varying the set value of the charging current control unit on the basis of the reduction of the input voltage detected by the input voltage detecting unit. Accordingly, the charging current is controlled in the range of an input electric power allowed in accordance with the voltage variation of the input power source so that a current supplied to the battery pack is less than a predetermined value.

According to another aspect of the invention, the power supplying unit is composed of a switching power circuit. The switching power circuit includes a transformer having a primary coil which are connected to an output end of an input power source and a secondary coil, a switching element which is series-connected to the primary coil, a drive signal control unit for supplying a pulse drive signal to a control electrode of the switching element, and a rectifier smoothing circuit which is connected to the secondary coil and supplies a charging current to the battery pack. The charging current control unit controls the output of the rectifier smoothing circuit by controlling a pulse width of the pulse drive signal of the drive signal control unit on the basis of the reduction of the input voltage detected by the input voltage detecting unit, and reduces the charging current.

According to still another aspect of the invention, the set value control unit, which controls a set value of the charging current applied to the charging current control unit, is composed of a microcomputer. When it is discriminated that the input voltage is less than a predetermined value on the basis of the detection signal of the input voltage detecting unit, the microcomputer sets the charging current set value to be less than the predetermined value.

According to further another aspect of the invention, the microcomputer constituting the set value control unit stores a relationship between a voltage of the input power source of the charging device and a current capable of being supplied to the battery by the power supplying unit, and then determines the set value on the basis of the stored relationship between the input voltage and an electric power.

According to still another aspect of the invention, an input power of the power supplying unit is composed of a power rectified from an AC power source through a rectifier circuit, and the input voltage detecting unit detects a rectified voltage of the rectifier circuit.

According to the above-aspects of the invention, when the input voltage of the charging device is reduced, the charging current is reduced and the charge is performed so that the electric power is supplied to the battery to be charged in the allowed range of the input electric power. Accordingly, it is possible to charge a secondary battery under the power condition in which the input voltage is reduced.

DESCRIPTION OF THE PREFERRED EMBODIMENTS

Figure 2:
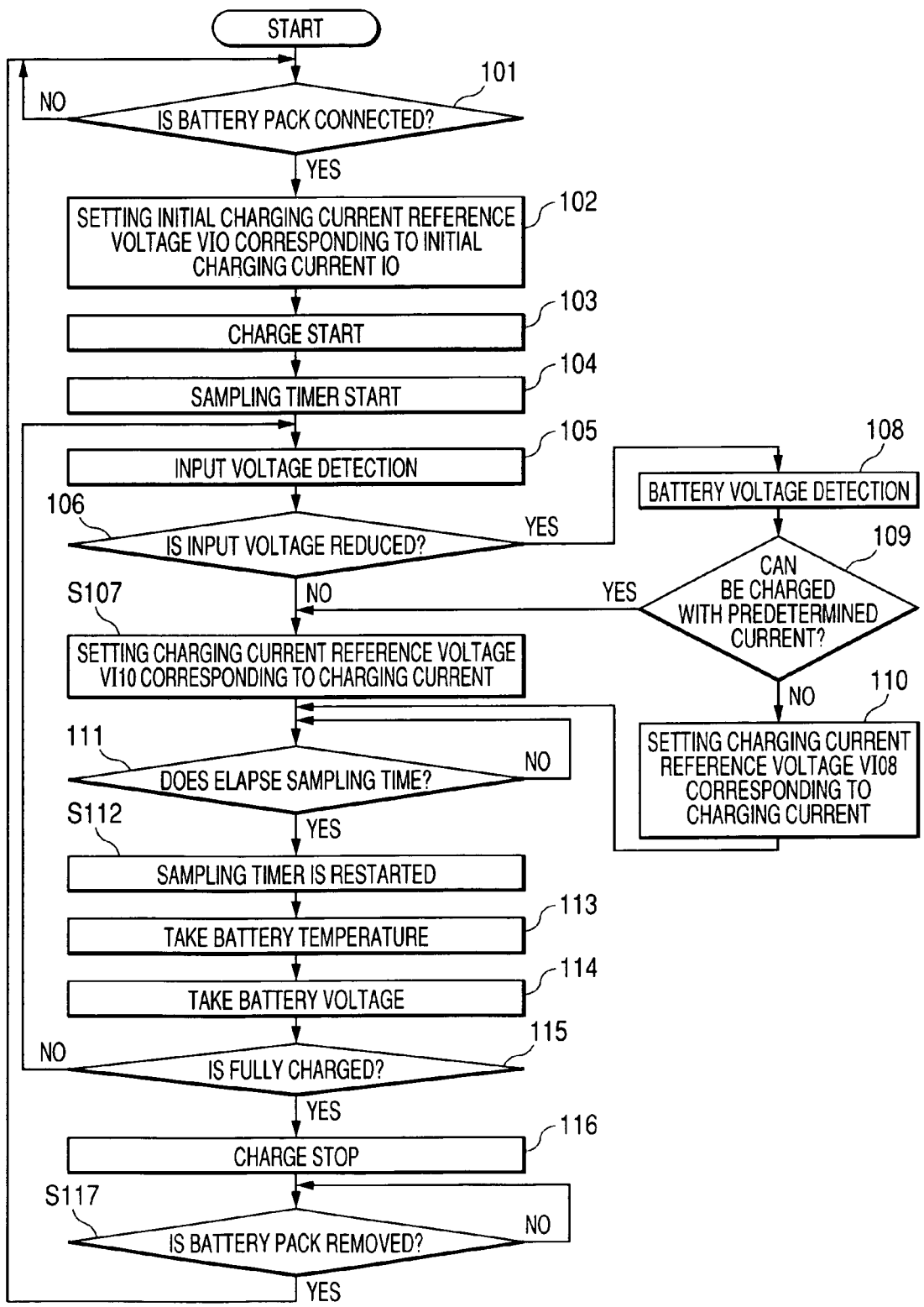
FIG. 2 is an operation flow chart of the charging device according to the embodiment of the invention.
Figure 3:
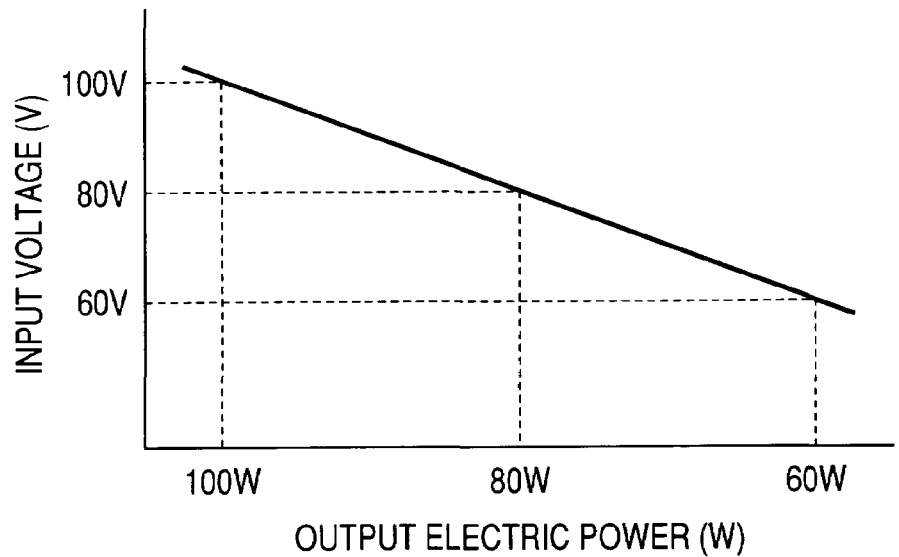
FIG. 3 is a graph showing input and output characteristic of the charging device according to the embodiment of the invention.
Figure 4:
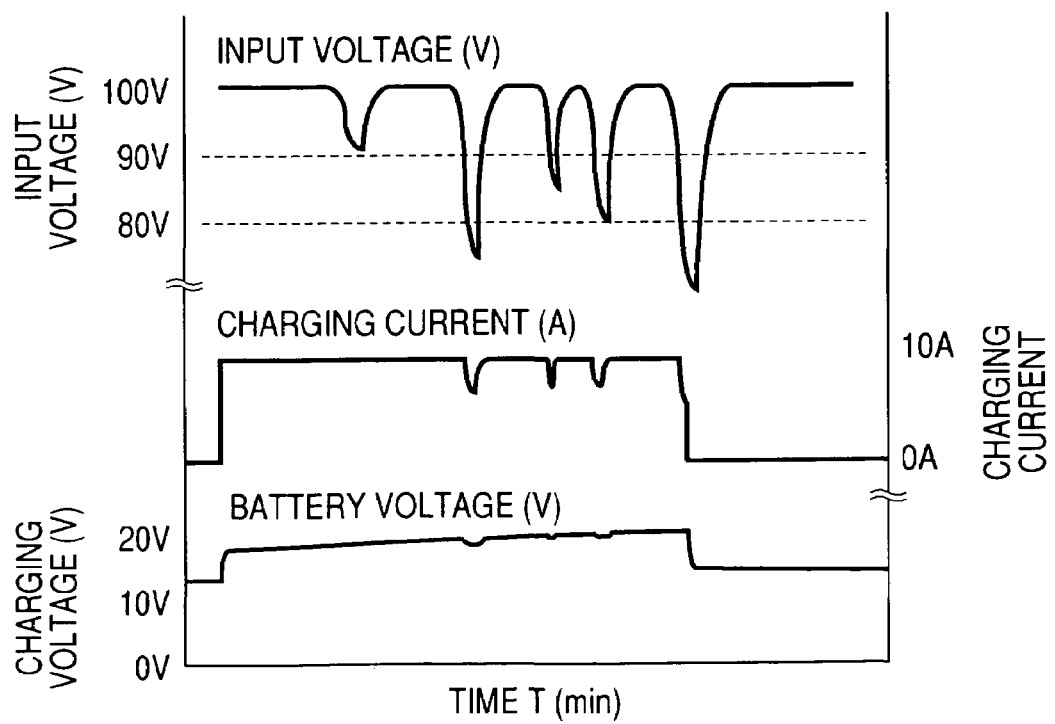
FIG. 4 is a graph showing a reduction of output voltage caused by a reduction of an input voltage in a charging device according to the related art.

Hereinafter, an embodiment of the invention will be described in detail with reference to FIG. 1 to 3.

Figure 1:
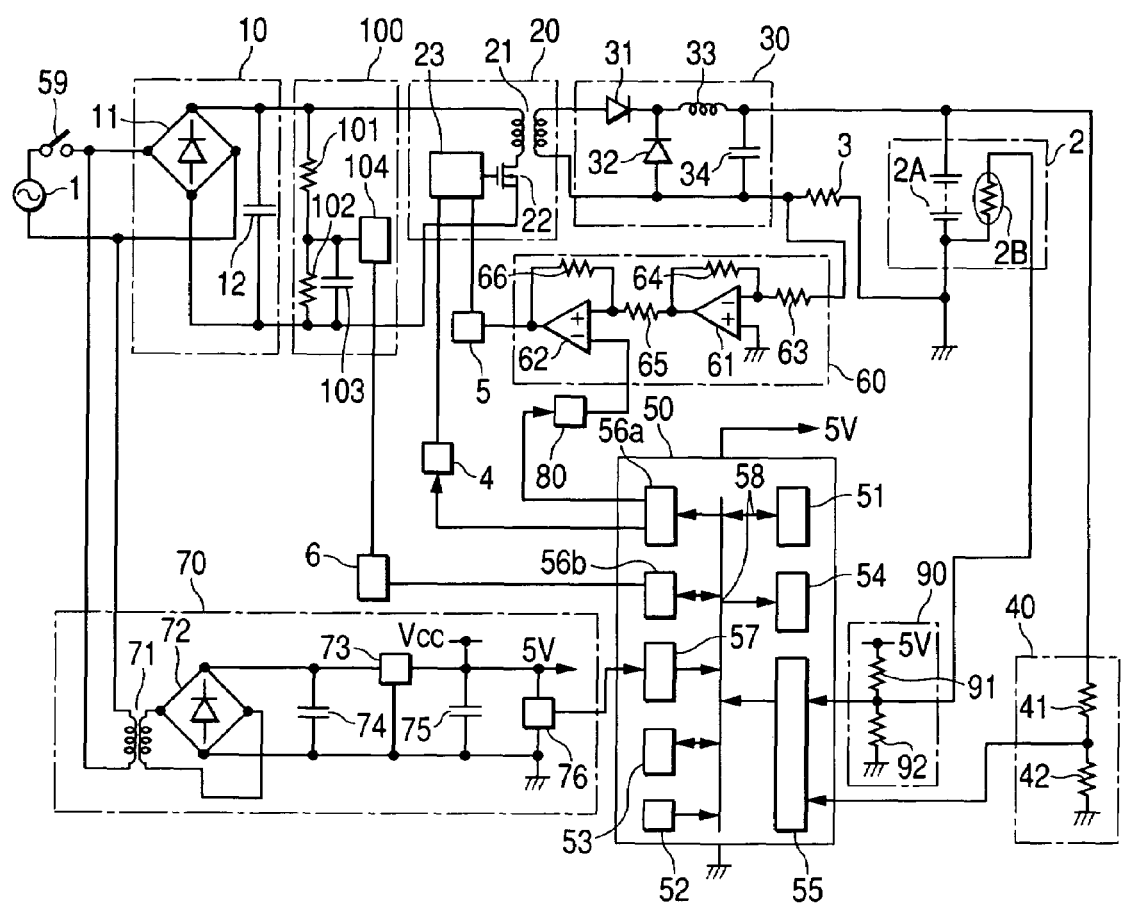
FIG. 1 is a block circuit diagram showing a charging device according to an embodiment of the invention.

FIG. 1 is a circuit diagram of a battery charging apparatus according to an embodiment of the invention. In FIG. 1, a battery pack 2 to be charged by a charging device is composed of a plurality of series-connected rechargeable battery cells 2A and a thermosensitive element 2B, such as a thermistor, which is disposed to come in contact with or is disposed close to the battery cells 2A. For example, the battery pack 2 is composed of eight Ni—Cd battery cells 2A, which are series-connected to one another and each have a voltage of about 1.2V, to obtain a voltage of about 9.6 V.

A power supplying unit for supplying electric power (charging voltage and charging current) to the battery pack 2 includes a first rectifier smoothing circuit 10, a switching circuit 20, and a second rectifier smoothing circuit 30.

The first rectifier smoothing circuit 10 is composed of a full-wave rectifier circuit 11 and a smoothing capacitor 12. The switching circuit 20 is composed of a high frequency transformer (step-down transformer) 21, a MOSFET (switching element) 22 which is series-connected to a primary coil of the transformer 21, a PWM control IC (drive signal control unit) 23 for modulating a pulse width of a drive pulse signal which is applied to a gate electrode of the MOSFET 22. The PWM control IC 23 controls a time in which the MOSFET 22 is in the ON-state to adjust an output voltage of the second rectifier smoothing circuit 30 and a charging current of the battery pack 2 by varying a width of a drive pulse supplied to the gate electrode of the MOSFET 22 on the basis of a control input signal input by a charging current signal transmitting unit 5. The second rectifier smoothing circuit 30 is composed of diodes 31 and 32 connected to the side of a secondary coil of the transformer 21, a choke coil 33, and a smoothing capacitor 34. A power is supplied from a commercial AC power source 1 to the first rectifier smoothing circuit 10 through a power switch 59.

A charging current control unit 60 is electrically connected to the power supplying unit that includes the first rectifier smoothing circuit 10, the switching circuit 20, and the second rectifier smoothing circuit 30. The charging current control unit 60 includes a operational amplifying circuit that is composed of operational amplifiers 61 and 62, input resistors 63 and 65, and feedback resistors 64 and 66.

An input side of the charging current control unit 60 is connected to a current detecting unit 3 for detecting a charging current of the battery pack 2. In addition, an output side of the charging current control unit 60 is electrically connected to the above-mentioned PWM control IC 23 through the charging current signal transmitting unit 5. Furthermore, a charging current setting unit 80 is connected to a reverse input terminal of the operational amplifier 62. The charging current setting unit 80 sets the magnitude of a charging current in response to a control signal that is output from an output port 56a of a microcomputer (set value control unit) 50 to be described below. That is, a voltage value applied to the reverse input terminal of the operational amplifier 62 is varied in accordance with the control signal output from an output port 56a. In such a construction, the charging current control unit 60 controls the charging current, which is supplied to the battery pack 2, in accordance with a set value of the charging current setting unit 80.

The charging current set value of the charging current setting unit 80 is controlled by the set value control unit, which is composed of the microcomputer 50. The microcomputer 50 is composed of each of functional blocks that include a CPU (central processing unit) 51 for executing a control program, a ROM (read only memory) 52 for storing the control program of the CPU 51, a RAM (random access memory) 53 to be used as a temporary storage area for data, a timer 54, a A/D converter 55 for converting analog signals, which are for a battery voltage detection signal and a temperature detection signal of the battery pack 2 to be described below, into digital signals, an output port 56a to which the control signal is output, an input port 56b to which the detection signal of an input power source to be described below is input, and a reset input port 57 to which a reset signal is input at power-on. The functional blocks are connected to one another via internal buses 58. For example, the CPU 51 computes a gradient of a battery temperature with respect to a time from the latest battery temperature stored in the RAM 53 and a battery temperature sampled with respect to each of sampling times stored in the RAM 53.

The voltage of the battery pack 2 is detected by a battery voltage detecting unit 40 that is composed of a voltage dividing resistors 41 and 42, and then is input to the A/D converter 55 of the microcomputer 50.

The temperature of the battery pack 2 is detected as a divided voltage according to the temperature variation by connecting the thermosensitive element 2B, which is provided in the battery pack 2, to a battery temperature detecting unit 90, which is composed of resistors 91 and 92 series-connected to a constant voltage source of 5 V. Then, the detected voltage is input to the A/D converter 55 of the microcomputer 50.

Variation of the voltage of the input power source (power source), which is supplied to the switching circuit 20, is detected by an input voltage detecting unit 100. The input voltage detecting unit 100 is composed of voltage dividing resistors 101 and 102 for dividing the output voltage of the first rectifier smoothing circuit 10, a capacitor 103, and an input voltage reduction detecting circuit 104. The capacitor 103 is added in order not to detect the transitional voltage reduction, which is caused by noise during a time period shorter than a predetermined time period. The reduction signal of the input voltage detected by the input voltage detecting unit 100 is input to the input port 56b of the microcomputer 50 through an input voltage transmitting unit 6.

A signal, which instructs the start or stop of charge of the battery pack 2, is supplied to a control input port of the PWM control IC 23 through a charging control signal transmitting unit 4 from the output port 56a in accordance with the control program of the microcomputer 50. The switching circuit 20 controls the start or stop of the charge according to the control signal of the charging control signal transmitting unit 4.

Powers or bias powers of the microcomputer 50, the charging current control unit 60, and the battery temperature detecting unit 90 are supplied by a constant voltage power source 70 which composes a voltage source by the commercial AC power source 1. The constant voltage source 70 is composed of a power transformer 71, a full-wave rectifier circuit 72, a three-terminal regulator (IC) 73, smoothing capacitors 74 and 75, a reset IC 76.

The reset IC 76 of the constant voltage power source 70 outputs a reset signal to the reset input port 57 in order to initialize the microcomputer 50 at power-on.

Next, the operation of the battery charging circuit according to the embodiment of the invention shown in FIG. 1 will be described with reference to a flow chart shown in FIG. 2.

If the power is supplied by the power switch 59, a charging program starts for the battery pack 2 to be in the standby state. If an operation proceeds to a step 101, the microcomputer 50 discriminates whether the battery pack 2 is connected to the charging device. If the battery pack 2 is connected to the charging device, the microcomputer 50 discriminates the connection of the battery pack 2 by a signal obtained from the battery voltage detecting unit 40. Then, if the connection of the battery pack 2 is confirmed, the operation advances to the next step 102.

In the step 102, since the battery pack 2 begins to be charged with an initial charging current IO, the microcomputer 50 outputs a control signal by the output port 56a to give an initial charging current setting reference voltage VIO, which is required to set an initial charging current IO via the charging current setting unit 80, to an inverting input terminal of the operational amplifier 62.

Next, in a step 103, a charging start signal, which allows the battery pack 2 to be charged by the initial charging current IO output from the output port 56a of the microcomputer 50, is output, and then is input to the PWM control IC 23 through the charging control signal transmitting unit 4. For this reason, the PWM control IC 23 is in the operating state to begin charging the battery pack 2 by the initial charging current IO.

In this case, the charging current setting unit 80 gives the initial charging current setting reference voltage VIO corresponding to the initial charging current IO as "reference voltage" to the operational amplifier 62, and the charging current control unit 60 controls the charging current of the battery pack 2 to be the initial charting current IO in accordance with the initial charging current setting reference voltage VIO supplied to the operational amplifier 62.

Here, even though a voltage of the input power source, which is detected by the input voltage detecting unit 100, is decreased, the initial charging current setting reference voltage VIO, which is applied from the charging current setting unit 80, is set to a value required for supplying a sufficient charging current.

In addition, at the start of the charge, the charging current flown into the battery pack 2 is detected by the current detecting unit 3, and a difference signal between the detection voltage corresponding to the charging current and the initial charging current setting reference voltage VIO is amplified by the charging current control unit 60. After that, the difference signal is fed back to the PWM control IC 23 through the charging current signal transmitting unit 5. Accordingly, a pulse width of the drive pulse signal generated by the PWM control IC 23 is modulated in accordance with the magnitude of the difference signal. As a result, if the charging current of the battery pack 2 is large, the switching element 22 supplies a pulse voltage (or current) with a narrow pulse width to the high frequency transformer 21. In contrast, if the charging current of the battery pack 2 is small, the switching element 22 supplies a pulse voltage (or current) with a wide pulse width to the high frequency transformer 21. Then, the pulse voltage is smoothed by the second rectifier smoothing circuit 30 to keep the charging current of the battery pack 2 constant. That is, the current detecting unit 3, the charging current control unit 60, the charging current signal transmitting unit 5, the switching circuit 20, and the second rectifier smoothing circuit 30 constitute a charging current control circuit to control the charging current to be the initial charging current IO.

After beginning charging the battery pack 2, if the operation proceeds to a step 104, the microcomputer 50 starts a sampling timer to take data at a predetermined time. The data includes an input voltage detected by the input voltage detecting unit 100, a battery voltage during the charge that is detected by the battery voltage detecting unit 40, and a battery temperature detected by the battery temperature detecting unit 90.

In a step 105, the output of the input voltage detecting unit 100 connected to the input voltage transmitting unit 6 is read at the input port 56b.

Next, if the operation proceeds to a step 106, it is discriminated whether an input voltage (output voltage of the first rectifier smoothing circuit 10) of the switching circuit 20 of the power supplying unit is reduced. If a result of the discrimination is discriminated as "NO", that is, the input voltage is not reduced, the operation proceeds to a step 107.

In a step 107, since the input voltage is not reduced, the microcomputer 50 sets a charging current setting reference voltage value, which is applied to the operational amplifier 62 by the output port 56a through the charging current setting unit 80, to a predetermined value VI10 (hereinafter, referred to as a "predetermined reference voltage value"), and makes the charging current control unit 60 operate so that the predetermined charging current I10 (hereinafter, referred to as a "predetermined charging current value") is flown to the battery pack 2. The predetermined reference voltage value VI10, which is newly set by the charging current setting unit 80, is directly compared to a voltage with respect to the charging current detected by the current detecting unit 3, and then the difference between the predetermined reference voltage value VI10 and the voltage with respect to the charging current is fed back to the PWM control IC 23 through the charging current signal transmitting unit 5 by the charging current control unit 60 so that the charging current flown into the battery pack 2 is controlled to be the predetermined charging current value I10.

In addition, if a result of the discrimination of the step 106 is discriminated as "YES", that is, a reduction of the input voltage is detected by the input voltage detecting unit 100, the operation proceeds to a step 108.

In a step 108, the battery voltage of the battery pack 2 is taken at the A/D converter 55 of the microcomputer 50 by the output of the battery voltage detecting unit 40.

Next, in a step 109, whether the predetermined charging current value I10 is flown into the battery pack 2 is discriminated from a reduction of the input voltage. If a result of the discrimination is discriminated as "YES", that is, the predetermined charging current value IO can be flown into the battery pack 2, the operation proceeds to the step 107 and then the microcomputer 50 sets the charging current setting reference voltage value, which is applied to the operational amplifier 62 through the charging current setting unit 80 by the output port 56a, to the predetermined reference voltage VI10. The charging current of the battery pack 2 is set to the predetermined charging current value I10 by the feedback operation of the charging current control unit 60 on the basis of the setting to the predetermined reference voltage value VI10.

In a step 109, if a result of the discrimination is discriminated as "NO", that is, the battery pack 2 cannot be charged with the predetermined charging current value I10, the operation proceeds to a step 110.

In the step 110, the microcomputer 50 sets the charging current setting reference voltage value, which is applied to the operational amplifier 62 through the charging current setting unit 80 by the output port 56a, to a reference voltage value VI08 lower than the predetermined reference voltage value VI10. The charging current control unit 60 sets the charging current of the battery pack 2 to a charging current I08 lower than the predetermined charging current value I10 by the setting to the low reference voltage value VI08. That is, the charging current setting reference voltage value VI08, which is newly set by the charging current setting unit 80, is directly compared to a voltage with respect to the charging current, which is detected by the current detecting unit 3, by the operational amplifier 62, and then the difference between the charging current setting reference voltage value VI08 and the voltage with respect to the charging current is fed back to the PWM control IC 23 through the charging current signal transmitting unit 5 by the charging current control unit 60 so that the battery pack 2 is charged with the charging current I08 lower than the predetermined charging current value I10.

Here, the predetermined charging current value I10 varies according to the type of the battery pack 2, and is selected to a charging current value, which is suited to the characteristic of the battery pack 2. According to the embodiment of the invention, as more clearly, when the input voltage of the charging device (output voltage of the first rectifier smoothing circuit 10) is reduced due to the voltage variation of the commercial AC power source 1, the charge of the battery pack 2 reducing the charging current is continued in the range of the output electric power, which is allowed by the input electric power, without stopping the output of the charging device (the second rectifier smoothing circuit 30).

The setting of the charging current I08 lower than the predetermined charging current value I10 suited for charge can be set by the input and output characteristics of the charging device. For example, it is thought that the charging current of the charging device with the input and output characteristic shown in FIG. 3 is set. In a case in which the predetermined charging current value I10 is 10 A and the battery pack 2 with a battery voltage of about 10 V is charged, if the input voltage of the switching circuit 20 is 100 V, the output electric power is 100 W. When the input voltage is reduced to be 80 V, the output electric power is 80 W. Accordingly, when the input voltage is 100 V, it is possible to set the charging current to the predetermined charging current value (I10) of 10 A (=100 W/10 V). Meanwhile, if the input voltage is reduced to be 80 V, an allowable electric power is 80 W. Therefore, it is possible to set the charging current to 8 A (=80 W/10 V), which is a value (I08) lower than the predetermined charging current value I10 of 10 A.

If the battery voltage of the battery charged by the same charging device is 8 V, in a case in which another battery pack with the predetermined charging current value I10 of 10 A is charged, even though the input voltage is reduced to be 80 V, it is possible to charge the battery pack with 10 A (80 W/8 V=10 A). Therefore, it is unnecessary to reset the charging current to the low current value (I08). That is, even though the input voltage is reduced, it is possible to continue charging the battery with the predetermined charging current value I10. Accordingly, it is possible to set the charging current in accordance with the reduction of the input voltage by preliminarily storing the limited charging current at the time of reduction of the input voltage in the ROM 52 of the microcomputer 50 in response to the input and output characteristics of the charging device.

In a step 111, the sampling timer started in the step 104 discriminates whether the predetermined time elapses. If a result of the discrimination is discriminated as "YES", that is, the timer discriminates that the predetermined time elapses, the sampling timer is restarted in a step 112.

Next, in a step 113, a divided voltage of the voltage dividing resistor 92 of the battery temperature detecting unit 90 is A/D converted by the A/D converter 55 so that the battery temperature is taken to the microcomputer 50.

In addition, if the operation proceeds to a step 114, the battery voltage during the charge of the battery pack 2 is divided at the voltage dividing resistors 41 and 42 of the battery voltage detecting unit 40. Then, the divided voltage value is A/D converted by the A/D converter 55 so that the battery voltage is taken to the microcomputer 50. Here, the taken battery temperature and the battery voltage are stored in the RAM 53 of the microcomputer 50 every sampling time to be used for a full charge processing of the next step 115.

In the step 115, whether the battery pack 2 is fully charged is discriminated. A detecting method can be employed as a method of discriminating the full charge. For example, it is possible to employ a known "$-\Delta V$ detection" method in which the charge is controlled on the basis of the output of the battery voltage detecting unit 40 by detecting the predetermined amount descent of the battery voltage from the peak voltage upon the charge to be fully charged. Furthermore, it is possible to employ a "second-order differential" method or a "$\Delta T$ detection" method as another method. In the "second-order differential" method, the charge is stopped before the battery voltage reaches the peak. Therefore, a second-order differentiated value is obtained by second-order differentiating variation of the battery voltage by time, and then tit is decided that the charge is completed when the second-order differentiated value is to be negative. In the $\Delta T$ detection method, a temperature rise of the battery pack 2 is detected from the start of the charge on the basis of the output of the battery temperature detecting unit 90, and then it is decided that the charge is completed when the temperature rise is more than a predetermined temperature rise. In addition, "dT/dt detection" methods are disclosed, for example, in the JP-A-62-193518, JP-A-2-246739, JP-UM-A-3-34638, and JP-A-2001-169473, and these technologies can be employed in the embodiment of the invention. In these dT/dt detection methods, the battery temperature rise per predetermined time (temperature gradient) is detected during the charge, and then it is decided that the charge is completed when the battery temperature rise per predetermined time is more than the predetermined value.

In the step 115, if the battery pack 2 is discriminated to be fully charged (a result of the discrimination is discriminated as "YES"), the operation proceeds to a step 116. Then, the microcomputer 50 transmits the charge stop signal from the output port 56a to the PWM control IC 23 through the charging control signal transmitting unit 4 to stop the charge.

Next, if the operation proceeds to a step 117, it is discriminated whether the battery pack 2 is removed by the charging device. When it is discriminated that the battery pack 2 is removed, the operation returns to the step 101 to be in the standby state of the next charge.

In the step 115, when it is discriminated that the battery pack 2 is not fully charged, reprocessing from the step 105 is performed.

According to the embodiment of the invention, as more clearly, under the power condition in which the voltage variation of the input power source, which supplies power to the charging device in the building site, is severe, even though the input voltage is reduced, it is possible to charge the battery pack with a proper charging current value or output power by detecting and monitoring the input voltage of the charging device. Therefore, it is possible to prevent from the generation of heat caused by the efficiency reduction of the charging device.

As described above, although the invention invented by the inventor is described in detail on the basis of the embodiment, the invention is not limited to the embodiment and can be variously modified within the scope of the invention.

What is claimed is:

1. A battery charging apparatus comprising:
   a plurality of input terminals receiving an Alternating Current (AC) voltage from an AC power;
   a first rectifier smoothing circuit for rectifying and smoothing the AC voltage;
   a switching circuit connected across a plurality of output terminals of the first rectifier smoothing circuit to provide pulse signal;
   a second rectifier smoothing circuit for rectifying and smoothing the pulse signals;
   an output voltage of the second rectifier smoothing circuit being applied to a battery to be charged;
   a charge current control unit that detects a charging current flowing through the battery and controls the charging current in accordance with a charging current set value;
   a first voltage detecting unit for detecting a voltage across the battery;
   a second voltage detecting unit for detecting an input voltage which is applied to the switching unit; and
   a microcomputer which sets a first charging current set value when the input voltage applied to the switching circuit is greater than a predetermined value and sets a second charging current set value which is smaller than the first charging current value when the input voltage of the switching circuit becomes smaller than the predetermined value.

2. The battery charging apparatus according to claim 1, wherein the switching circuit includes:
   a transformer having a primary coil and a secondary coil;
   a switching element which is series-connected to the primary coil; and
   a drive signal control unit for supplying a pulse drive signal to a control electrode of the switching element.

3. The battery charging apparatus according to claim 1, wherein the
   microcomputer stores a relationship between an output voltage of the second voltage detecting unit and a current capable of being supplied to the battery by the switching circuit, and
   wherein the microcomputer determines the charging current set value based on the stored relationship.

4. A battery charging apparatus comprising:
   a plurality of input terminals receiving an Alternating Current (AC) voltage from an AC power source;
   a first rectifier smoothing circuit for rectifying and smoothing the AC voltage;
   a switching circuit connected across a plurality of output terminals of the first rectifier smoothing circuit to provide pulse signals;
   a second rectifier smoothing circuit for rectifying and smoothing the pulse signals;
   an output voltage of the second rectifier smoothing circuit being applied to a battery to be charged;
   a charging current setting unit that sets a set value corresponding to a charging current flowing through the battery;
   a charging current control unit that controls the charging current supplied to the battery in accordance with the set value;
   a set value control unit that controls the set value to be applied to the charging current setting unit;
   a first voltage detecting unit for detecting a voltage across the battery; and
   a second voltage detecting unit for detecting an input voltage which is applied to the switching circuit,
   wherein the set value control unit reduces the charging current to be supplied to the battery by varying the set value based on a reduction of the input voltage detected by the second voltage detecting unit.

5. The battery charging apparatus according to claim 4, wherein the set value control unit further includes:
   a microcomputers;
   a detection signal of the input voltage detected by the second voltage detecting unit is input to an input port of the microcomputer; and
   a control signal varying the set value of the charging current control unit is output by an output port of the microcomputer.

6. The battery charging apparatus according to claim 5, wherein the microcomputer stores a relationship between an output voltage of the second voltage detecting unit and a current capable of being supplied to the battery by the power switching circuit, and
   wherein the microcomputer determines the charging current set value based on the stored relationship.

7. A battery charging apparatus comprising:
   A plurality of input terminals receiving an Alternating Current (AC) voltage from an AC power source;
   a first rectifier smoothing circuit for rectifying and smoothing the AC voltage;
   a switching circuit connected across a plurality of output terminals of the first rectifier smoothing circuit to provide pulse signals;
   a second rectifier smoothing circuit for rectifying and smoothing the pulse signals;
   an output voltage of the second rectifier smoothing circuit being applied to a battery to be charged;
   a charging current control unit that detects a charging current flowing through the battery and controls the charging current in accordance with a charging current set value;
   a first voltage detecting unit for detecting a voltage across the battery;
   a second voltage detecting unit for detecting an input voltage which is applied to the switching circuit; and
   a microcomputer that reduces the charging current to be supplied to the battery by varying the set value based on a reduction of the input voltage detected by the second voltage detecting unit.

8. The battery charging apparatus according to claim 7, wherein the microcomputer discriminates whether the battery is connected to the battery charging apparatus by a signal obtained form the first voltage detecting unit.

9. The battery charging apparatus according to claim 7, wherein the microcomputer sets an initial charging current set value corresponding to an initial charging current when the battery is connected.

10. The battery charging apparatus according to claim 7, wherein the microcomputer determines whether the input voltage of the switching circuit is reduced, and
   wherein the microcomputer sets a first charging current setting value corresponding to a first charging current when the input voltage is not reduced.

11. The battery charging apparatus according to claim 10, wherein the microcomputer discriminates whether the battery is capable of being charged with the first charging current when the input voltage is reduced.

12. The battery charging apparatus according to claim 11, wherein the microcomputer sets a second charging current setting value lower than the first charging current setting value, which is corresponding to a second charging current lower than the first charging current, when the battery is not capable of being charged with the first charging since the input voltage is reduced.

* * * * *